United States Patent
Cieslinski

(10) Patent No.: US 7,940,316 B2
(45) Date of Patent: May 10, 2011

(54) DIGITAL MOTION PICTURE CAMERA WHICH COMBINES IMAGES OF DIFFERENT EXPOSURE TIMES

(75) Inventor: Michael Cieslinski, Unterhaching (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 895 days.

(21) Appl. No.: 11/861,401

(22) Filed: Sep. 26, 2007

(65) Prior Publication Data

US 2008/0079841 A1    Apr. 3, 2008

(30) Foreign Application Priority Data

Oct. 2, 2006   (DE) .......................... 10 2006 046 720

(51) Int. Cl.
*H04N 5/335* (2006.01)
*H04N 5/262* (2006.01)
(52) U.S. Cl. .................. 348/296; 348/239; 348/368
(58) Field of Classification Search .................. 348/296, 348/297, 239
See application file for complete search history.

(56) References Cited

U.S. PATENT DOCUMENTS

| | | | |
|---|---|---|---|
| 6,204,881 B1 | 3/2001 | Ikeda et al. | |
| 6,529,640 B1 * | 3/2003 | Utagawa et al. | 382/284 |
| 7,202,891 B1 * | 4/2007 | Ingram | 348/262 |
| 2001/0030708 A1 | 10/2001 | Ide et al. | |
| 2002/0118293 A1 | 8/2002 | Hori et al. | |
| 2002/0154829 A1 | 10/2002 | Tsukioka | |
| 2003/0142745 A1 | 7/2003 | Osawa | |
| 2003/0169361 A1 | 9/2003 | Kandleinsberger et al. | |
| 2004/0001639 A1 | 1/2004 | Ohno | |
| 2006/0133688 A1 | 6/2006 | Kang et al. | |
| 2007/0177035 A1 * | 8/2007 | Hatano et al. | 348/231.99 |

FOREIGN PATENT DOCUMENTS

| | | |
|---|---|---|
| EP | 0 920 196 A2 | 6/1999 |
| EP | 0 975 154 A1 | 7/1999 |
| EP | 1 343 312 A1 | 3/2002 |
| EP | 1 318 668 A2 | 6/2003 |
| EP | 1 343 312 B1 | 4/2006 |

OTHER PUBLICATIONS

European Search Report dated Sep. 14, 2007. Application No. 07 014 925.7 7 pages.
German Search Report dated Aug. 17, 2007. Application No. 10 2006 046 720.5. 9 pages.

* cited by examiner

*Primary Examiner* — Jason Whipkey
(74) *Attorney, Agent, or Firm* — Gifford, Krass, Sprinkle, Anderson & Citkowski, P.C.

(57) ABSTRACT

A digital motion picture camera for the taking of motion pictures includes an optoelectronic sensor device having a plurality of sensor elements for the generation of received signals in dependence on the exposure time, a digitizing device for the digitizing of the received signals and an electronic control device for the control of the exposure time and the reading out of the received signals and for the evaluation of these received signals. A plurality of images taken with different exposure times are combined with one another by means of the control device, with the time centers of the images to be combined with one another between a respective start of recording and a respective end of recording coinciding at least substantially.

16 Claims, 3 Drawing Sheets

DIGITAL MOTION PICTURE CAMERA WHICH COMBINES IMAGES OF DIFFERENT EXPOSURE TIMES

Figure 1:
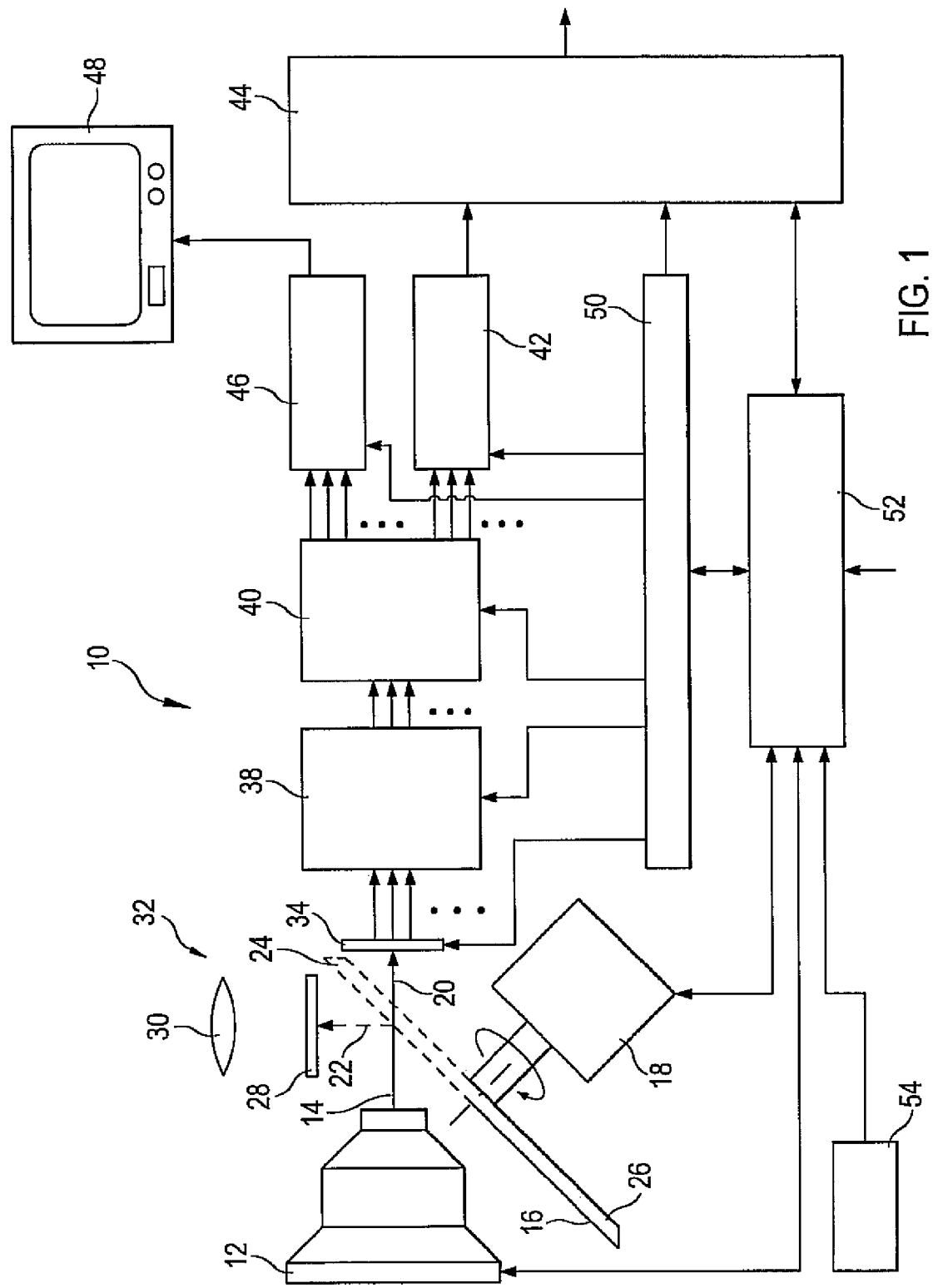

The invention relates to a digital motion picture camera for the taking of motion pictures comprising an optoelectronic sensor device having a plurality of sensor elements for the generation of received signals in dependence on the exposure time, a digitizing device for the digitizing of the received signals and an electronic control device for the control of the exposure time and the reading out of the received signals and for the evaluation of these received signals. A motion picture camera of this kind is described in EP 1 343 312 B1.

With motion picture cameras of this kind, the received electrical signals of the photoelectric sensor elements of the sensor device can be digitized while still inside the camera, optionally after amplification, so that the image information is present directly in a digital format and can thus be processed electronically without any further action and can be reproduced without any substantial loss in quality. For example, the frequency at which the sequential motion pictures are taken can also be varied, and indeed in a manner predeterminable by the user. Digital motion picture cameras of this kind can therefore in particular also be used alternatively to motion picture cameras for the exposure of a photochemical negative film for moved film recordings of high picture quality, that is, for example, also for television films, cinema commercials, cinema films or also industrial or medical applications.

Two principally different kinds of optoelectronic image sensors are known, that is so-called integrating sensors and so-called non-integrating sensors.

The integrating sensors are sensors whose output signal is dependent on the integral of the quantity of light which is incident onto a respective picture element or pixel. In most cases, they have an almost linear characteristic which means that the output signal is approximately proportional to the incident quantity of light and is thus proportional to the product of exposure time and brightness at a constant brightness. In contrast, the output signal with the non-integrating sensors is dependent on the instantaneous value of the quantity of light incident onto a picture element or pixel. They frequently have a logarithmic characteristic. The output signal here is therefore approximately proportional to the logarithm of the quantity of light incident onto the picture element at that moment in time.

The non-integrating sensors have the advantage that they have a large dynamic range due to the logarithm characteristic. However, the signals of these sensors suffer to a high degree from noise, with the noise being amplified if the signals are transformed back into the linear range. Since the output signal of these sensors depends on the instantaneous value of the exposure, a lighting of the scene constant in time is required. A use of such sensors in cameras with a mechanical shutter such as are in particular used in motion picture recording is therefore practically precluded since the output signal is actually not proportional to the quantity of light which was incident on the respective picture element or pixel when the shutter was open.

Integrating sensors have the advantage that their output signal is proportional to the product of mean brightness and exposure time and thus fluctuating brightness values such as occur for example with fluorescent lamps do not play any role when a whole-number multiple of the period of the brightness fluctuation is selected as the exposure time. This sensor type can also be integrated into a camera with a mechanical shutter. The signals of these integrating sensors only have low noise, but the dynamic range is limited as a result of the linear characteristic.

The exposure time can generally be varied to expand the dynamic range. However, only the exposure of the total image can be varied in this manner, whereas the dynamic range within the image is not increased.

It is also feasible to take a plurality of images sequentially with different exposure times and to combine them with one another. If, for example, an image is taken with an exposure time of 2 ms and a further image is taken with an exposure time of 20 ms, all dark image regions can be taken from the image with the relatively longer exposure time and the image regions in which the image with the longer exposure time has been overshot can be taken over from the image of a relatively lower exposure time.

In addition to the integrating and non-integrating sensor types, there are also mixed forms, that is sensors which work in a linear and integrating manner up to a specific control and only change into a mode with a logarithmic characteristic with a high control. A relatively large dynamic range is admittedly achieved with such mixed forms, but an operation with a mechanical shutter is not possible since the output signal depends on the instantaneous brightness in the mode with a logarithmic characteristic and consequently a logarithmic output signal is no longer present after the mechanical shutter has been closed.

The cameras used for the recording of moving pictures for a later presentation in a cinema usually have a rotating mirror shutter which allows the light to be incident onto the film during a part of the rotating time and which specularly reflects the light into an optical viewfinder during the other part of the rotating time while the film is being transported.

If now an electrooptical image sensor is used instead of a film in a camera of this type, only a sensor of the integrating type can be used in which the output signal is proportional to the integral of the brightness during the time in which the rotating mirror shutter releases the ray path. Only then does a similar image impression arise with moving scenes or, for example, camera panning.

However, due to their linear characteristic, the integrating sensors have a limited dynamic range which lies, for example, in the range from 500:1 to 2000:1. In contrast, a photographic film has a dynamic range of more than 10,000:1. Consequently, electrooptical sensors can only be used with restrictions for this application.

If the rotating mirror shutter were to be dispensed with and if a similar exposure time were to be set by a corresponding control of the sensor as with a mechanical motion picture camera, a plurality of images, for example two images, with different exposure times could be taken sequentially and combined to one image with increased dynamics for the expansion of dynamics. However, a problem occurs with moving scenes in this context. Since the two images are taken at different times, they show moving objects in different positions. A ball, for example, thus frequently has a highlight due to the sun reflected on it. If such a ball now rolls through the image, the recorded position of the highlight is displaced along the direction of movement in dependence on the speed, with it finally even coming to lie outside the ball at high speeds. An extremely irritating image impression thereby results. This effect can admittedly be reduced or even eliminated by estimating the movements and compensation of the position. However, this is extremely complex and/or costly and cannot practically be carried out in real time. In addition, a reliable estimate of movement is not possible with more complicated scenes.

To be able to use the respective camera universally, a high dynamic range is required which should be at least as high as the dynamic range of photographic film. However, the dynamic range cannot be practically increased so much by construction measures at the sensor that a comparable dynamic range as with a motion picture camera for the exposure of a photochemical negative film is achieved with a digital motion picture camera. The required dynamic range could admittedly be reached in that a plurality of images of different exposure times are taken sequentially and combined with one another. However, moving objects bring along the previously explained errors.

It is the underlying object of the invention to provide an improved digital motion picture camera of the initially named kind with which the aforesaid problems have been eliminated. The dynamic range should in particular be expanded while avoiding the positional displacement with moving motifs.

This object is satisfied in accordance with the invention in that a plurality of images taken with different exposure times are combined with one another by means of the control device, with the time centers between a respective start of a recording and a respective end of a recording of the images to be combined with one another coinciding at least substantially.

If, for example, two images of different exposure times are combined with one another, the time center of the image of relatively shorter exposure time is inside the total time period between the start of recording and the end of recording of the image of relatively longer exposure time, with the longer exposure in particular also being able to be split up or interrupted. At least substantially coinciding time centers are therefore here to be understood, in particular for the case of two images of different exposure times being combined with one another, such that the recording time period of a respective image of relatively shorter exposure time is inside the total taking time period from the first start of recording up to the optionally second end of recording of a respective image of relatively longer exposure time and is preferably arranged centrally therein.

Due to this design, the dynamic range can be substantially expanded by the combination of the images taken with different exposure times without any positional displacement taking place as a consequence of moving objects. Since the time centers between a respective start of recording and a respective end of recording of the images to be combined with one another coincide at least substantially, such a positional displacement is in particular also practically precluded with faster moving objects. The dynamic range of the motion picture camera achieved in accordance with the invention is not only comparable with that of a motion picture camera for the exposure of a film, it can even surpass the dynamic range of such a film camera. The digital motion picture camera can now in particular also be provided with a mechanical shutter such as a rotating mirror shutter or the like. The combination of the images of different exposure times is now also possible without the previously required complex and/or expensive estimate of movement which was not always reliable. Such an estimate of movement can, however, be applied as an offline method to give the images of shorter exposure time additional motion blur.

The optoelectronic sensor device preferably includes integrating sensor elements. These integrating sensor elements can in particular be such sensor demands whose received signal is dependent on the integral of the quantity of light incident onto the respective picture element or pixel. Such an integrating sensor element can moreover in particular have an almost linear characteristic, which means that the received signal is approximately proportional to the quantity of light and is correspondingly proportional to the product of exposure time and brightness with a constant brightness. Fluctuating lighting brightness values such as occur, for example, with fluorescent lamps, therefore at least no longer play any role when a whole-number multiple of the period of the brightness fluctuation is chosen as the exposure time. Such an integrating sensor type can also be integrated without problem into a digital camera provided with a mechanical shutter.

In accordance with a preferred practical embodiment of the motion picture camera in accordance with the invention, the optoelectronic sensor device includes at least one CMOS sensor which has corresponding integrating properties.

A preferred embodiment of the motion picture camera in accordance with the invention, which is in particular of advantage on a use of an optoelectronic sensor device with integrating sensor elements, is characterized in that at least one first image of relatively longer exposure time and at least one second image of relatively shorter exposure time having at least substantially coinciding time centers are combined with one another, with the first image of relatively longer exposure time being assembled by means of the control device from at least two part images taken sequentially in time, namely from a first part image (in the following: "preceding part image") and from a part image taken after the first part image (in the following: "succeeding part image"), with the time center of the first image being defined by the time center between the start of recording of the preceding part image and the end of recording of the succeeding part image.

Expediently, the first image is assembled in that the received signals of the mutually corresponding sensor elements of the two part images defining the first image of relatively longer exposure time are added by means of the control device.

It is also in particular of advantage when the start of recording of the second image of relatively shorter exposure time coincides with the end of recording of the two part images defining the preceding part image of the assembled first image of relatively longer exposure time The sensor device is preferably reset between the recordings of the different images and part images. The relatively longer exposure is therefore interrupted here. For this purpose, the first image of relatively longer exposure time is assembled from the two images of relatively longer exposure time recorded sequentially in time. Since the sensor device is reset between its recordings, the information obtained from the preceding image of the two images recorded sequentially in time is deleted. It is therefore not included in the subsequently taken succeeding image of relatively longer exposure time.

The optoelectronic sensor device is preferably reset at the time of the end of recording of the preceding part image of the two part images defining the first image of relatively longer exposure time or at the time of the start of recording of the second image of relatively shorter exposure time.

In this connection, the optoelectronic sensor device can be reset a further time at the time of the end of recording of the second image of relatively shorter exposure time. In this case, the time of the start of recording of the succeeding part image of the two part images defining the first image of relatively longer exposure time advantageously coincides with the time of the end of recording of the second image of relatively shorter exposure time.

In accordance with an alternative expedient embodiment, the time of the start of recording of the succeeding part image of the two part images defining the first image of relatively longer exposure time can, however, also coincide with the time of the end of recording of the preceding part image of the assembled first image or with the time of the start of recording of the second image of relatively shorter exposure time. In this case, the optoelectronic sensor device is therefore not reset at the time of the end of recording of the second image of relatively shorter exposure time.

In accordance with a preferred practical embodiment of the motion picture camera in accordance with the invention, the sensor elements of the optoelectronic sensor device can be controlled by means of the control device for the generation of the images of different exposure times to be combined with one another such that at least three received signals are read out from a respective sensor element sequentially in time, with the first received signal being used for the forming of the preceding part image of the two part images defining the first image of relatively longer exposure time, the second received signal being used for the forming of the second image of relatively shorter exposure time and the third received signal being used for the forming of the succeeding part image of the two part images defining the first image of relatively longer exposure time, and with the sensor element preferably being reset at the time of the end of recording of the preceding part image of the two part images defining the first image of relatively longer exposure time or at the time of the start of recording of the second image of relatively shorter exposure time.

In this connection, the sensor element can be reset a further time at the time of the end of recording of the second image of relatively shorter exposure time to thereby define the time of the start of recording of the succeeding part image of the first image of relatively longer exposure time.

In an alternative expedient embodiment, the time of the start of recording of the succeeding part image of the two part images defining the first image of relatively longer exposure time coincides with the time of the start of recording of the second image of relatively shorter exposure time. In this case, the sensor element is therefore not reset at the time of the end of recording of the second image of relatively shorter exposure time.

The images to be recorded with different exposure times can also be taken without an intermediate reset of the sensor device or of the individual sensor elements. During the continuous exposure or signal integration, first intermediate values and finally a final value are read out for the respective sensor element in this case without resetting the previously respectively generated received signal. The respective integration values for the different exposure tunes are then determined by calculation for a respective picture element from the said intermediate values and the end value.

As already mentioned, the motion picture camera in accordance with the invention can advantageously be provided with a mechanical shutter connected in front of the optoelectronic sensor device.

In this connection, in particular a rotating mirror shutter can be provided as the mechanical shutter. Such a rotating mirror shutter can preferably serve to alternately transmit incident light to the optoelectronic sensor device or to specularly reflect it into an optical viewfinder.

The named combining of the images taken with different exposure times generally takes place such that, for each picture element or for each sensor element of the sensor device, that received signal value of the images taken with different exposure times is identified which is still below a saturation threshold of the respective sensor element, but which has the largest value. Ultimately, that signal value with the largest usable signal-to-noise ratio is hereby selected for each sensor element. Such a selection can, for example, be carried out by means of a comparator circuit which can be part of the said control device. The signal values of the different images selected in this manner are then assembled to a result image, with a mutual norming preferably being carried out to take account of the different exposure times of the recorded images.

If, for example, two images of different exposure times should be combined with one another, the image of relatively shorter exposure time can be taken inside, and preferably in the middle of, the exposure time of the image of relatively longer exposure time. This is in particular achieved in that the long exposure is split, in particular at the middle. Since the image of relatively shorter exposure time is taken inside the image of relatively longer exposure time, it is provided that their time centers at least substantially coincide. The image of relatively shorter exposure time is preferably arranged centrally in the image of relatively larger exposure time. As already mentioned, this is, however, not compulsory in each case. It is frequently sufficient if the image of relatively shorter exposure time is inside the time period between the first-time start of recording and the final end of recording of the image of relatively longer exposure time, i.e. the time centers of these images substantially coincide.

It is, for example, therefore possible to read three images out of the sensor and indeed first an image or image section with relatively long exposure, second an image with relatively short exposure and third again an image or image section with relatively long exposure. The first and the third images or also all three images can be added electronically and form the image with the long exposure time. This can then be combined with the second image in that the positions which are overshot are replaced by the corresponding position from the second image. The dark image regions can be taken from the image of relatively longer exposure time. Since the centers of the exposure periods coincide at least substantially, the positional displacement practically does not occur with moving objects. Only the motion blur of the two images is different which is, however, not perceived nearly as much disturbing as a positional displacement.

Admittedly, the basic noise of the sensor is included twice due to a division of the long exposure time into two images which are read out separately. However, this is countered by the fact that a substantially higher quantity of light is required for the saturation of the sensor with the shorter exposure time, which results in a substantially larger dynamic range which can even surpass the dynamic range with film motion picture cameras.

The images of different exposure times can now be combined with one another without the previously required very complex and/or costly and not always reliable estimate of movement. The estimate of movement can, however, be used as an offline method to given the images with the short exposure time additional motion blur.

Figure 2:
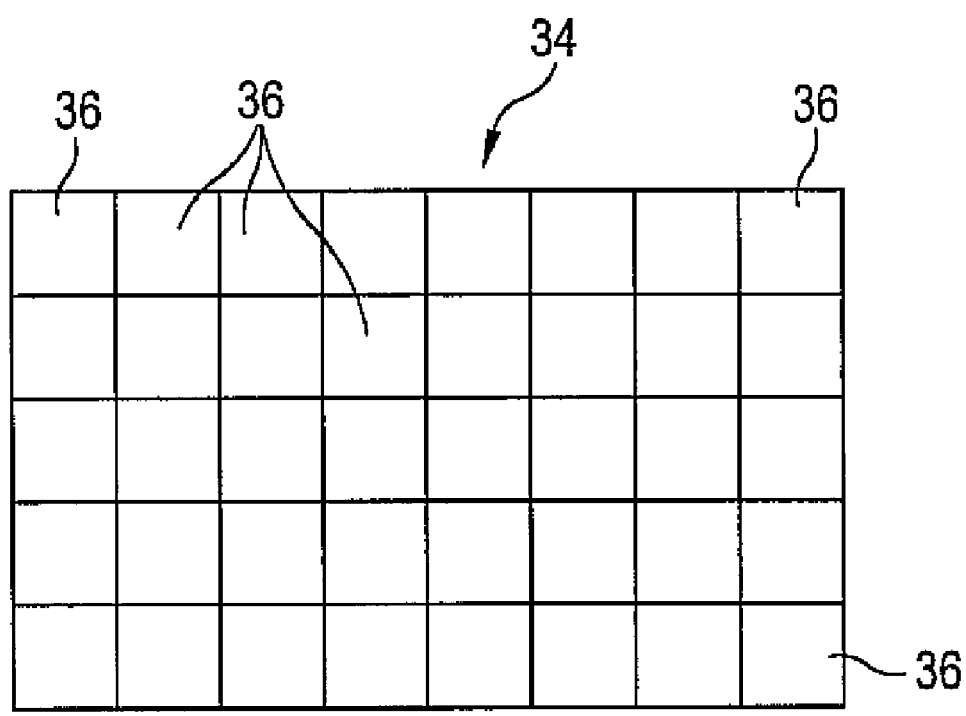
Figure 3:
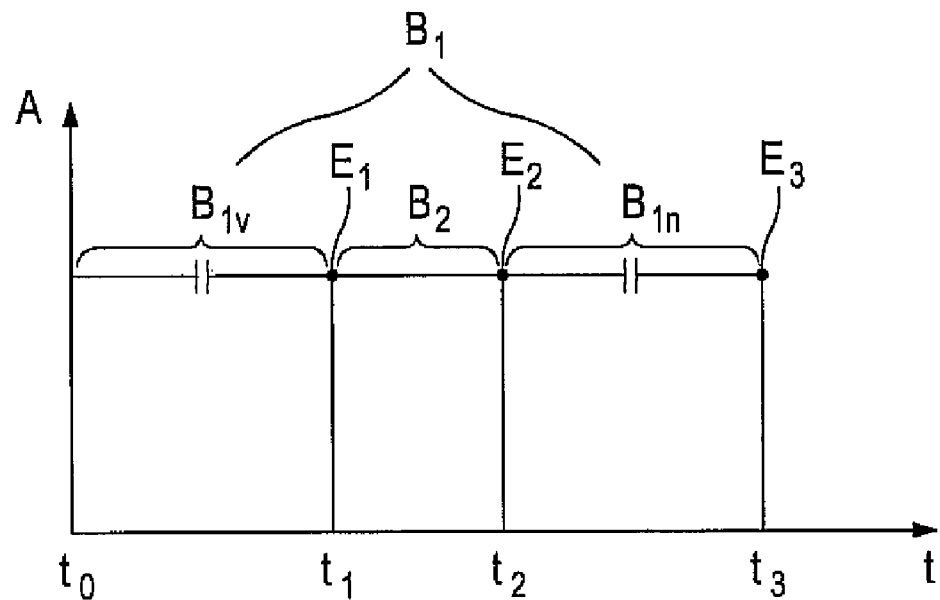
Figure 4:
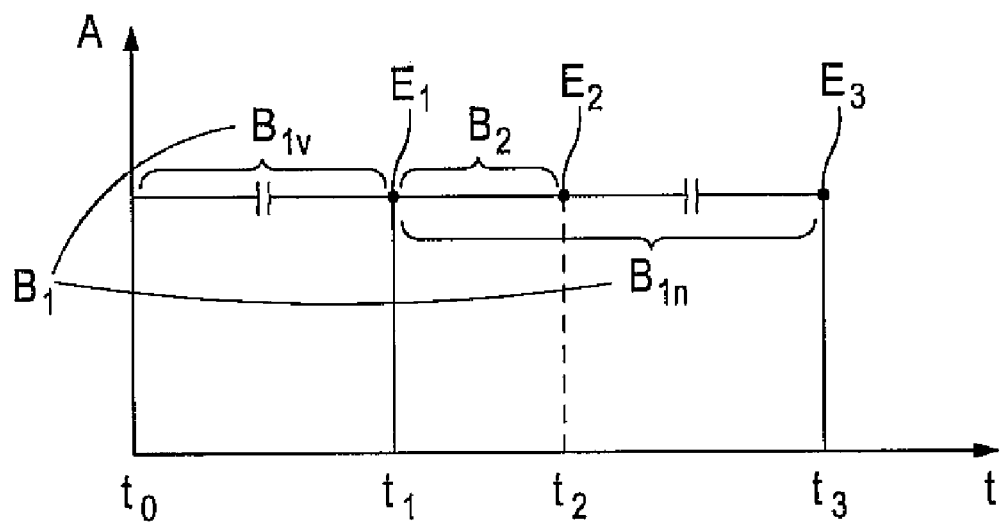

The invention will be explained in more detail in the following with reference to embodiments and to the drawing; there are shown in it:

FIG. 1 a schematic representation of an exemplary embodiment of a digital motion picture camera;

FIG. 2 an exemplary areal arrangement of sensor elements of the electrooptical sensor device of the motion picture camera;

FIG. 3 a time diagram for an exemplary control of a respective sensor element of the optoelectric sensor device; and FIG. 4 a time diagram for another exemplary control of a respective sensor element of the optoelectronic sensor device.

FIG. 1 shows in a schematic representation an exemplary embodiment of a digital motion picture camera 10.

The motion picture camera 10 includes a taking lens 12 which images the motion picture currently to be recorded along a receiving beam path 14. The light incident along the receiving beam path 14 is alternately transmitted in the direction of a taking beam path 20 or deflected in the direction of a viewfinder beam path 22 by means of a mechanical shutter, here a rotating mirror shutter 16 which can be driven to make a rotary movement by a drive unit 18. For this purpose, the rotating mirror shutter 16 has a passage opening 24 and a mirror coated deflection region 26.

If the deflection region 26 is located in the receiving beam path 14, the image detected by the taking lens 12 is imaged on a ground glass screen 28 so that a real image is created on it which can be observed by the cameraman using an optical viewfinder system 30, whereby an optical viewfinder 32 is formed.

In contrast, at those times at which, as shown in FIG. 1, the passage opening 24 is in the receiving beam path 14, the motion picture to be recorded is imaged by the taking lens 12 without any further deflection onto an optoelectronic sensor device 34 which is located in the same optical position as the glass screen 28 with respect to the taking lens 12.

The optoelectronic sensor device 34 comprises, in a matrix-like areal arrangement, a plurality of sensor elements 36 (cf. FIG. 2) which can generate a respective received signal corresponding to the light intensity and the exposure time as a result of the light exposure through the passage opening 24 of the rotating mirror shutter 16. The optoelectronic sensor device 34 can, for example, have an arrangement of 1920× 1080 or 2880 or 2160 such sensor elements 36.

The received signals generated by the sensor device 34 are supplied to an amplifier device 38 which has a corresponding number of electronic amplifiers. The received signals amplified in this way are digitized in a following digitizing device 40 by a corresponding number of analog/digital converters.

The digitizing device 40 is connected via a data interface 42 to a storage device 44 which records the received and digitized, and optionally correspondingly processed, received signals on a magnetic hard disk, for example, in real time.

In addition, the received signals can be supplied via a further data interface 46 connected to the digitizing device 40 to a display monitor 48 in order also to permit a simultaneous observation of the motion pictures on it, optionally also at a location remote from the camera.

The data flow from the sensor device 34, optionally via the amplifier device 38 and via the digitizing device 40, to the data interface 42 and the storage device 44, on the one hand, and optionally to the data interface and the display monitor 48, on the other hand, can be controlled by an electronic control device 50 which is connected for this purpose to the named components 34, 38, 40, 42 and 46. This electronic control device 50 can in particular also control the reading out of the received signals of the individual sensor elements 36 of the sensor device 34.

In addition, a camera control device 52 is provided which can be connected to the taking lens 12, to the drive unit 18 for the rotating mirror shutter 16, to the electronic control device 50, to the storage device 44 and furthermore to a camera sensor 54 which, for example, detects the brightness of the scene to be recorded or individual regions thereof. The camera control device 52 synchronizes the procedure of the digital motion picture recording with the control or signal processing of the further camera components and it makes possible the input by the cameraman of setting parameters via a user interface now shown in the present FIG. 1.

The digital motion picture camera 10 shown permits the recording and storing of image signal data in a digital format and simultaneously a direct optical observation of the recorded scenes via the optical viewfinder 32 as well as optionally an electrooptical control observation of the recorded data at the display monitor 48.

In the embodiment shown in FIG. 1, the optoelectronic sensor device 34 is formed by a CMOS sensor including integrating sensor elements. The integrating sensor elements can be controlled individually to effect a resetting or a subsequent reading out of the photoelectric charge or of a corresponding voltage signal at any desired time.

With such a CMOS sensor, the light acting on a sensor element is converted into a photoelectric charge and ultimately into a voltage signal whose value increases during the period light acts on it. A single sensor element can be short-circuited and thus reset to set the voltage value to zero and thus to allow the exposure period to begin at a defined time. Equally, the reading out of such an integrating sensor element 36 can take place at any desired, defined time in order to obtain a received signal which corresponds to a predetermined exposure period. Since both the start time and the end time of the exposure period can be set as desired, ultimately the frequency at which the image data sets of all sensor elements 36 are generated together can also be varied. The CMOS sensor thus permits inter alia a variation of the frame taking frequency.

With the optoelectronic sensor device 34 shown, the control of the exposure time and optionally the frame taking frequency take place electronically, with the control device 50 correspondingly also controlling the drive unit 18 of the rotating mirror shutter 16 via the camera control device 52 to control or influence the darkening or the light exposure of the sensor device 34 via the deflection region 26 and the passage opening 24 of the rotating mirror shutter 16.

FIG. 2 schematically shows a possible matrix-like areal division of the light-sensitive front side of an optoelectronic sensor device 34 into a plurality of sensor elements 36, with only a small number of such sensor elements 36 being shown for a simplified representation.

The received signals of these sensor elements 36 are preferably read out at least group-wise, preferably parallel overall. Generally, however, a sequential reading out is also conceivable at least in part. With a respective resetting of the sensor elements 36, the voltage values previously generated photoelectrically thereon are again set to zero. After the resetting of a respective sensor element 36 and provided there is light exposure, the generation and collection of photoelectrical charge is again directly started. Both the reading out and the resetting of these sensor elements 36 can take place via the electronic control device 50.

In the present case, the electronic control device 50 of the digital motion picture camera 10 is formed such that at least one first image of relatively longer exposure time and at least one second image of relatively shorter exposure time are recorded in an overlapping manner with time centers coinciding at least substantially and are combined with one another. Coinciding time centers are here generally to be understood such that the taking period of the second image of relatively shorter exposure time is inside the region between the start of recording of the first image of relatively longer exposure time and the end of recording of the first image of relatively longer exposure time, with the recording period of the second image preferably being centered in this region of relatively longer exposure.

The first image of relatively longer exposure time is preferably assembled by the control unit 50 from two part images taken sequentially in time between whose recordings the optoelectronic sensor device 34 is reset, with the time center of the first image being defined by the time center which is between the start of recording of the preceding part image and the end of recording of the succeeding part image of the first image of relatively longer exposure time.

In FIG. 3, a time diagram is shown for an exemplary control of a respective sensor element 36 of the optoelectrical sensor device 34. In this connection, the control state A of a respective sensor element 36 is shown over the time t.

Accordingly, for the generation of the two images $B_1$, $B_2$ of different exposure times to be combined with one another, the sensor elements 36 of the optoelectronic sensor device 34 can be controlled by means of the electronic control device 50 such that at least three received signals $E_1$-$E_3$ are read out from a respective sensor element sequentially in time, and indeed at the times $t_1$, $t_2$ and $t_3$. A first received signal $E_1$ is therefore read out at the time $t_1$, a second received signal $E_2$ at the time $t_2$ and a third received signal $E_3$ at the time $t_3$—from one and the same sensor element.

In this connection, the first received signal $E_1$ is used for forming the so-called preceding part image $B_{1v}$ of the two part images $B_{1v}$, $B_{1n}$ defining the first image $B_1$ of relatively longer exposure time, the second received signal $E_2$ is used for forming the second image $B_2$ of relatively shorter exposure time and the third received signal $E_3$ is used for forming the so-called succeeding part image $B_{1n}$ of the first image $B_1$ of relatively longer exposure time. The sensor element 36 is reset at least at the time $t_1$ of the end of recording of the preceding image $B_{1v}$ of the first image $B_1$ of relatively longer exposure time which coincides with the time of the start of recording of the second image $B_2$ of relatively shorter exposure time.

In the present case, the sensor element 36 is reset a further time at the time $t_2$ of the end of recording of the second image $B_2$ of relatively shorter exposure time. Accordingly, the time $t_2$ here also corresponds to the start of recording of the following part image $B_{1n}$ of the first image $B_1$ of relatively longer exposure time. The exposure times of the two part images $B_{1v}$ and $B_{1n}$, which can be the same or also different, are preferably each longer than the exposure time of the second image $B_2$.

The received signals $E_1$, $E_3$ of the two part images $B_{1v}$, $B_{1n}$ taken sequentially in time and defining the first image $B_1$ of relatively longer exposure time are added by means of the electronic control device 50. The first image $B_1$ of relatively longer exposure time thereby obtained is then combined by means of the control device 50 with the second image $B_2$ of relatively shorter exposure time. In this connection, for example, all dark image regions can be taken from the image $B_1$ of relatively longer exposure time and the image regions in which the image $B_1$ of relatively longer exposure time is overshot, can be taken over from the other image $B_2$ of relatively shorter exposure time.

The larger the difference between the exposure time of the first image $B_1$ of relatively longer exposure time and the exposure time of the second image $B_2$ of relatively shorter exposure time, the larger the dynamic range. The exposure time of the first image $B_1$ can thus, for example, be ten times larger than the exposure time of the second image $B_2$. Generally, however, different time relationships are also conceivable.

In the embodiment in accordance with FIG. 3, the start of recording of the second image $B_2$ of relatively shorter exposure time coincides with the end of recording $t_1$ of the preceding part image $B_{1v}$ of the two part images $B_{1v}$, $B_{1n}$ defining the first image $B_1$. The optoelectronic sensor device 34 is reset at the time $t_1$ of the end of recording of the preceding part image $B_{1v}$ so that the recording of the second image $B_2$ of relatively shorter exposure time start at this point in time. At the time $t_2$ of the end of recording of this second image $B_2$ of relatively shorter exposure time, the optoelectronic sensor device 34 or the respective sensor element in the present case is reset a further time. The time of the start of recording of the succeeding part image $B_{1n}$ of the assembled first image $B_1$ of relatively longer exposure time correspondingly coincides with the time $t_2$ of the end of recording of the second image $B_2$ of relatively shorter exposure time.

In contrast, a respective sensor element 36 is controlled in accordance with the time diagram shown in FIG. 4 such that the time of the start of recording of the succeeding part image $B_{1n}$ of the two part images $B_{1v}$, $B_{1n}$ defining the first image $B_1$ of relatively longer exposure time coincides with the time $t_1$ of the end of recording of the preceding part image $B_{1v}$ of the assembled first image $B_1$ of relatively longer exposure time which simultaneously corresponds to the time of the start of recording of the second image $B_2$ of relatively shorter exposure time. The first image $B_1$ of relatively longer exposure time thus corresponds to the two part images $B_{1v}$, $B_{1n}$ and additionally to the second image $B_2$ of relatively shorter exposure time.

It must still be noted with respect to FIGS. 3 and 4 that the received signals E1 to E3 can also be read out without an intermediate resetting of the individual sensor elements 36 to record the different images with different exposure times. At least some of the received signals E1 to E3 are preferably offset with one another. For example, the second image $B_2$ of relatively shorter exposure time can be calculated by subtraction of the received signals E2 minus the received signals E1, whereas the first image $B_1$ of relatively longer exposure time either results from the received signals E3 (i.e. without determining part images $B_{1v}$, $B_{1n}$ or from the received signals E3 minus the received signals E2 plus the received signals E1 (i.e. subtraction of the second image $B_2$ of relatively shorter exposure time).

REFERENCE NUMERAL LIST 10 digital motion picture camera
12 taking lens
14 receiving beam path
16 rotating mirror shutter
18 drive unit
20 taking beam path
22 viewfinder beam path
24 passage opening
26 mirror-coated deflection region
28 ground glass screen
30 optical viewfinder system
32 optical viewfinder
34 optoelectrical sensor device
36 sensor element
38 amplifier device
40 digitizing device
42 data interface
44 storage device
46 data interface
48 display monitor
50 electronic control device
52 camera control device
54 camera sensor
$B_1$ first image of relatively longer exposure time $B_{1v}$ preceding part image of the first image $B_1$
$B_{1v}$ succeeding part image of the first image $B_1$
$B_2$ second image of relatively shorter exposure time
$E_1$ first received signal
$E_2$ second received signal
$E_3$ third received signal

The invention claimed is:

1. A digital motion picture camera (10) for the taking of motion pictures comprising an optoelectronic sensor device (34) having a plurality of sensor elements (36) for the generation of received signals in dependence on the exposure time, a digitizing device (40) for the digitizing of the received signals and an electronic control device (50) for the control of the exposure time and the reading out of the received signals and for the evaluation of these received signals,
characterized in that
a plurality of images ($B_1$, $B_2$) taken with different exposure times are combined with one another by means of the control device (50), with the time centers of the images ($B_1$, $B_2$) to be combined with one another between a respective start of recording and a respective end of recording coinciding at least substantially,
wherein at least one first image ($B_1$) of relatively longer exposure time and at least one second image ($B_2$) of relatively shorter exposure time having at least substantially coinciding time centers are combined with one another, with the first image ($B_1$) of relatively longer exposure time being assembled from at least two part images ($B_{1v}$, $B_{1n}$) taken sequentially in time by means of the control device (50), namely from a preceding part image ($B_{1v}$) and a succeeding part image ($B_{1n}$) and with the time center of the first image ($B_1$) being defined by the time center between the start of recording of the preceding part image ($B_{1v}$) and the end of recording of the succeeding part image ($B_{1n}$).

2. A motion picture camera in accordance with claim 1, characterized in that the optoelectronic sensor device (50) includes integrating sensor elements (36).

3. A motion picture camera in accordance with claim 1, characterized in that the optoelectronic sensor device (34) includes at least one CMOS sensor.

4. A motion picture camera in accordance with claim 1, characterized in that the received signals ($E_1$, $E_3$) of the two part images ($B_{1v}$, $B_{1n}$) defining the first image ($B_1$) of relatively longer exposure time are added by means of the control device (50).

5. A motion picture camera in accordance with claim 1, characterized in that the time of the start of recording of the second image ($B_2$) of relatively shorter exposure time substantially coincides with the end of recording of the preceding part image ($B_{1v}$) of the first image ($B_1$) of relatively longer exposure time.

6. A motion picture camera in accordance with claim 1, characterized in that the time of the start of recording of the succeeding part image ($B_{1n}$) of the first image ($B_1$) of relatively longer exposure time substantially coincides with the time ($t_2$) of the end of recording of the second image ($B_2$) of relatively shorter exposure time.

7. A motion picture camera in accordance with claim 1, characterized in that the time of the start of recording of the succeeding part image ($B_{1n}$) of the first image ($B_1$) of relatively longer exposure time coincides with the time ($t_1$) of the end of recording of the preceding part image ($B_{1v}$) of the first image ($B_1$) of relatively longer exposure time and/or with the time ($t_1$) of the start of recording of the second image ($B_2$) of relatively shorter exposure time.

8. A motion picture camera in accordance with claim 1, characterized in that the optoelectronic sensor device (34) is reset between the recording of the preceding part image ($B_{1v}$) of the first image ($B_1$) of relatively longer exposure time and the recording of the successive part image ($B_{1n}$) of the first image ($B_1$) of relatively longer exposure time.

9. A motion picture camera in accordance with claim 1, characterized in that the optoelectronic sensor device (34) is reset at the time ($t_1$) of the end of recording of the preceding part image ($B_{1v}$) of the first image ($B_1$) of relatively longer exposure time and/or at the time ($t_1$) of the start of recording of the second image ($B_2$) of relatively shorter exposure time.

10. A motion picture camera in accordance with claim 9, characterized in that the optoelectronic sensor device (34) is reset a further time at the time ($t_2$) of the end of recording of the second image ($B_2$) of relatively shorter exposure time.

11. A motion picture camera in accordance with claim 1, characterized in that, for the generation of the images ($B_1$, $B_2$) of different exposure times to be combined with one another, the sensor elements (36) of the optoelectronic sensor device (34) can be controlled by means of the control device (50) such that at least three received signals ($E_1$-$E_3$) are read out sequentially in time from a respective sensor element (36), with the first received signal ($E_1$) being received for forming the preceding part image ($B_{1v}$) of the first image ($B_1$) of relatively longer exposure time, the second received signal ($E_2$) is used for forming the second image ($B_2$) of relatively shorter exposure time and the third received signal ($E_3$) is used for forming the successive part image ($B_{1n}$) of the first image ($B_1$) of relatively longer exposure time.

12. A motion picture camera in accordance with claim 11, characterized in that the respective sensor element (36) is reset at the time ($t_1$) of the end of recording of the preceding part image ($B_{1v}$) of the first image ($B_1$) of relatively longer exposure time and/or at the time ($t_1$) of the start of recording of the second image ($B_2$) of relatively shorter exposure time.

13. A motion picture camera in accordance with claim 12, characterized in that the respective sensor element (36) is reset a further time at the time ($t_2$) of the end of recording of the second image ($B_2$) of relatively shorter exposure time; and in that the time ($t_2$) of the start of recording of the successive part image ($B_{1n}$) of the first image ($B_1$) of relatively longer exposure time is thereby defined.

14. A motion picture camera in accordance with claim 12, characterized in that the time of the start of recording of the succeeding part image ($B_{1n}$) of the first image ($B_1$) of relatively longer exposure time coincides with the time ($t_1$) of the start of recording of the second image ($B_2$) of relatively shorter exposure time.

15. A motion picture camera in accordance with claim 1, characterized in that the motion picture camera is provided with a mechanical shutter (16) connected before the optoelectronic sensor device (34).

16. A motion picture camera in accordance with claim 15, characterized in that the motion picture camera is provided with a rotating mirror shutter (16) connected before the optoelectronic sensor device (34).

* * * * *